United States Patent [19]

Ito et al.

[11] Patent Number: 5,262,255
[45] Date of Patent: Nov. 16, 1993

[54] NEGATIVE ELECTRODE FOR NON-AQUEOUS ELECTROLYTE SECONDARY BATTERY

[75] Inventors: Shuji Ito, Kadoma; Masaki Hasegawa; Hiroyuki Murai, both of Hirakata; Yasuhiko Bito, Yao, all of Japan

[73] Assignee: Matsushita Electric Industrial Co., Ltd., Kadoma, Japan

[21] Appl. No.: 826,993

[22] Filed: Jan. 28, 1992

[30] Foreign Application Priority Data

| Jan. 30, 1991 | [JP] | Japan | 3-009641 |
| Mar. 15, 1991 | [JP] | Japan | 3-051006 |
| Mar. 25, 1991 | [JP] | Japan | 3-060050 |
| May 30, 1991 | [JP] | Japan | 3-127321 |
| Jun. 10, 1991 | [JP] | Japan | 3-137414 |

[51] Int. Cl.$^5$ .................................................. H01M 4/04
[52] U.S. Cl. ........................................ 429/217; 429/212; 429/213
[58] Field of Search ........................................ 429/217

[56] References Cited

U.S. PATENT DOCUMENTS

| 3,954,506 | 5/1976 | Sullivan | 136/127 |
| 4,232,100 | 11/1980 | Magnusson et al. | 429/217 |
| 4,565,751 | 1/1986 | Faust et al. | 429/94 |
| 4,710,335 | 12/1987 | Kita et al. | 264/105 |

*Primary Examiner*—Prince Willis, Jr.
*Assistant Examiner*—M. Nuzzolillo
*Attorney, Agent, or Firm*—Ratner & Prestia

[57] ABSTRACT

This invention relates to a negative electrode for non-aqueous electrolyte secondary batteries that uses organic electrolyte made form an organic solvent solution of Li salt.

More specifically speaking, a highly reliable non-aqueous electrolyte secondary battery is realized by employing a negative electrode of high capacity and excellent cycle characteristics, wherein an active material holder composed of powdered metal, carbon, sulfide, oxide, etc. absorbs Li by charge and desorbes it by discharge or wherein a suitable polymer is used as a binder of the mixture comprising said active material holder and a conductive material. This invention greatly improves capacity and charge and discharge cycle life of not only a coin type cell but also a cylindrical cell, in which a thin and long strip type electrode plate is used and cycle characteristics are more critical.

7 Claims, 1 Drawing Sheet

NEGATIVE ELECTRODE FOR NON-AQUEOUS ELECTROLYTE SECONDARY BATTERY

BACKGROUND OF THE INVENTION

1. Field of the Invention

This invention relates to a negative electrode for a non-aqueous electrolyte secondary battery which uses an organic electrolyte with lithium salt dissolved in an organic solvent.

2. Description of the Prior Art

Reflecting the recent trend of increasing demands for smaller and lighter power supplies for use in portable electronic appliances, research and development activities on non-aqueous electrolyte secondary batteries with lithium (Li) as the negative active material are taking place actively in many countries of the world. These batteries usually have a higher operating voltage, requiring a high energy density. The well-known positive active materials for such batteries include chalcogenides of oxides or sulfides of transition metal such as $MnO_2$, $V_2O_5$, $Cr_3O_8$, $TiS_2$, $MoS_2$, etc. and also such double oxides as $LiMnO_2$, $LiMn_2O_4$, $LiCoO_2$, $LiNiO_2$ and the like. These active materials are of either layer or tunnel construction and have a crystal structure wherein Li ions are absorbed by discharge and desorbed by charge. On the other hand, the pure metal Li shows the highest operating voltage per unit cell as the negative electrode and studies have been conducted on Li for many years. However, the reaction wherein the metal Li is deposited by charge and dissolved by discharge is not necessarily reversible. During the times of discharge, dendrite or mossy bulk of Li crystal is deposited on the negative electrode surface, penetrating through separators and causing an internal short circuiting with a resultant shorter charge and discharge cycle life. Moreover, a shape change of the negative electrode and deterioration in the charge and discharge efficiency that develop with charge and discharge cycles will result in the problem of a capacity reduction of the negative electrode or the cell. As a solution, for example, to the problems of dendrite crystal deposition on the negative electrode and also a shape change of the electrode, metals like Al, Al alloy, Wood's metal and the like which easily alloy with Li are used as the holder of the active material. In this case, the metal Li deposited by charge is immediately diffused to make a Li alloy. During the times of discharge as the Li in the Li alloy formed on the negative electrode surface dissolves into the electrolyte, the Li of the Li alloy in the negative electrode moves by diffusion towards the negative electrode surface. Also, in this case a deep charge and discharge cycle application will cause a particle size reduction of the metal powder that forms the Li alloy and the active material holder, resulting in a great increase of the volume and the specific surface area of the metal powder and eventually a shape change of the negative electrode. In the case of a strip type negative electrode that uses a foil collector as the electrode core, defects of exfoliation between the foil collector and the metal powder layer of the active material holder will develop. Besides, a more active negative electrode surface due to increased specific areas of the metal powder tends to bring about such problems as ignition and the like.

In this case, such materials as carbon like graphite, sulfide, oxide or conductive polymer, wherein Li ions are doped by charge to form a Li compound and Li ions are undoped by discharge, may be used as the holder for the active material. As far as overcharging is not taking place, this arrangement is safe and makes a relatively high charge rate possible. Especially, the use of carbon material as in the foregoing has been receiving a special attention in recent years with the resultant established technology of so called "lithium ion rechargeable battery".

The non-aqueous electrolyte secondary battery using metal, carbon, oxide, sulfide, etc. in place of Li itself as the holder for the negative active material as described in the foregoing was produced in the beginning with a configuration of coin type or button type cell for the main application of memory back-up. However, as a light-weight compact main power source for the portable equipment, a cylindrical cell was developed and is actually used. This is constructed by having one sheet each of thin and long strip type positive plate and negative plate wound spirally with a micro-porous polypropyrene separator inserted in between, forming an electrode group. The electrode group is placed in a cell case to complete a cylindrical cell. The foregoing electrode group is constructed in such a way that organic electrolyte is fixed by absorption and no free electrolyte is existent. In this way, the facing area between positive and negative plates is increased, the electrode spacing is made uniform and free electrolyte is eliminated, consequently contributing to a uniform charge and discharge reaction due to a low current density and also to suppressed generation of dendrite crystal Li. The thin and long strip type positive and negative plates are made by coating the active material itself containing some binder or the active material holder, mixed with a necessary conductive material and formed to a paste-like condition, onto a collector of metal foils and then by drying and pressing the coating.

Since the electrode plates are to be wound, they have to be flexible and their surface needs to be smooth and also selection of the binder is very important. When metal foils are used as the collector, they have to be non perforated ones for the extension strength needed to build the electrode plates and for the flatness and the smoothness of the electrode plate surface. Therefore, the binder as used with the negative electrode for non-aqueous electrolyte secondary batteries that absorbs Li by charge and desorbs it by discharge and comprises powdered metal, carbon, sulfide, oxide and the like must have the following characteristics:

(1) It is not dissolved by the organic electrolyte used together.
(2) It is not affected by reduction that takes place at around the electrode potential of Li.
(3) It has a strong binding strength that holds together the particles of the powdered active material holder.
(4) It provides a strong binding strength working between the non-perforated metal foils and the active material holder, not causing any exfoliation between the two.
(5) Not only is its binding strength strong but its flexibility is sufficient.

So far, as the binder for the negative active material holder, polytetrafluoroethylene (PTFE) and the polyolefin group resins such as polyethylene (PE) that are usually used with the positive electrode have been studied. PTFE assumedly reacts with Li and tends to lower negative electrode capacity. In the case of PE, due to expanding and shrinking of the active material holder that accompanies with absorption and desorption of Li, the bonding between particles is not strong enough and especially exfoliation between the foil collector and the layer of active material holder tends to occur easily.

SUMMARY OF THE INVENTION

An object of this invention is to produce a negative electrode for non-aqueous electrolyte secondary batteries which does not cause much deterioration in capacity and in cycle life due to internal short circuits even after several charge and discharge cycles of a rather large magnitude. Especially, this invention is effective in producing a thin and long strip type negative electrode with such metal foils as copper, nickel, etc. used as the collector.

More specifically stating, this invention relates to a negative electrode for non-aqueous electrolyte secondary batteries composed of the following: Powdered metal, carbon, sulfide, oxide and the like. An active material holder wherein Li is absorbed by charge and desorbed by discharge.

A binder for the mixture of the foregoing active material holder and a conductive material, prepared by mixing vinylchloride-vinyl acetate co-polymer, polyvinyl chloride and a polymer to enhance the binding strength of the above polyvinyl chloride, and at least one selected from the group comprising rubber-like elastic polymers. Particularly, a paste prepared by adding a solution or a dispersion of said binder in a solvent dissolved or dispersed with the active material holder or the mixture of the active material holder and the conductive material and then by mulling the resultant product, is coated on a collector composed of foils of such metals as copper, nickel, etc. and the coated collector is pressed after drying to complete a flexible and smooth surface negative electrode for non-aqueous electrolyte secondary batteries. By this method it is made successfully possible to reduce the deterioration in capacity and cycle life that has been a problem of the conventional technology.

DETAILED DESCRIPTION OF THIS INVENTION

In selecting a suitable binder which forms an important element of this invention, experiments were conducted repeatedly about numerous combinations and confirmation of their suitability. With help of typical examples out of such experiments, a detailed description of this invention will be made in the following:

To begin with, the positive electrode that makes a counter electrode against this invention's negative electrode to be compared with the conventional one was prepared by applying a mixture paste comprising LiCoO$_2$ as an active material, acetylene black as a conductive material and PTFE as a binder with a weight ratio of 100:10:5 respectively, to a collector Al foil and then by roller pressing after drying. Dispersion was used with the binder PTFE. Since the purpose intended is to find negative electrode characteristics, the theoretical capacity of the positive electrode is made double that of the negative electrode.

Figure 1:
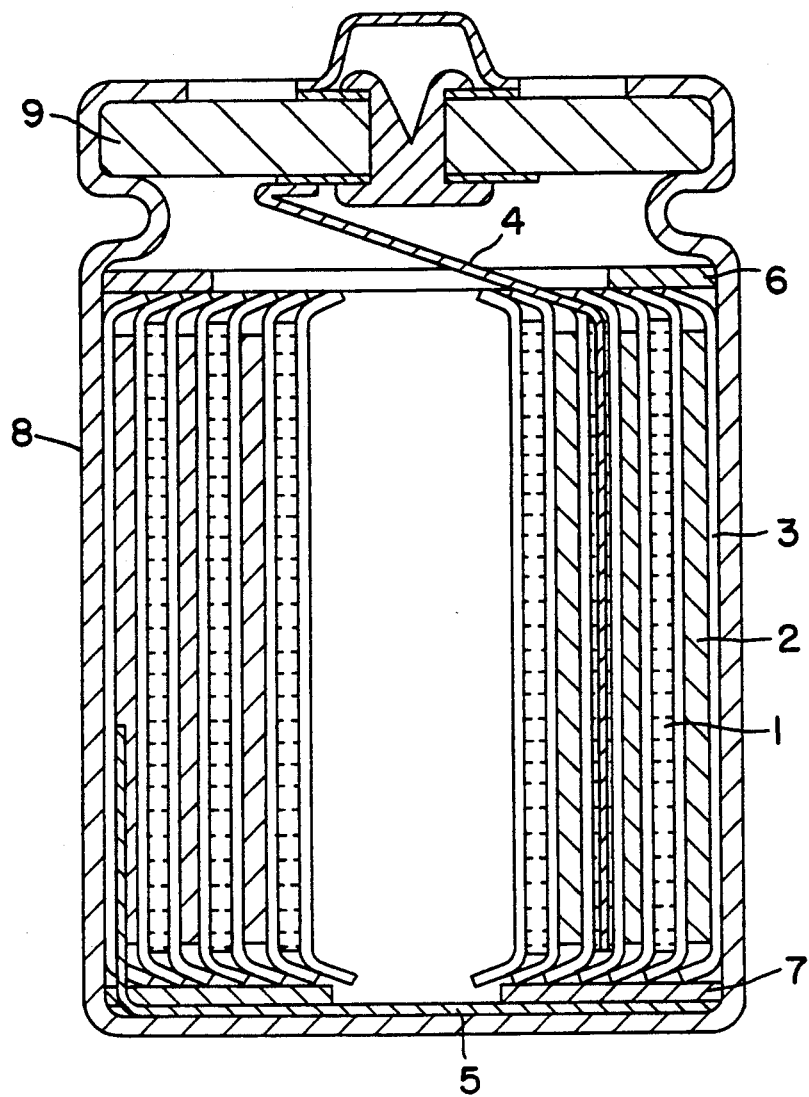
FIG. 1 shows a cross-sectional view of a typical non-aqueous electrolyte cylindrical secondary battery which employs a strip type negative electrode prepared according to this invention.

FIG. 1 shows the structure of a test cell of ½ A size (17.0 mm in diameter and 23.0 mm in overall height) that was used in the experiments. In FIG. 1 the positive electrode 1 and the negative electrode 2 are wound together tightly with a micro-porous polypropylene film 3 as a separator, forming an electrode group. The positive electrode 1 and the negative electrode 2 are attached respectively with a positive lead 4 and a negative lead 5, both of which are made of the same material as the collector.

The electrode group is contained in a cell case 8 with polypropylene insulating plates 6 and 7 placed on its upper end and its lower end respectively. The negative lead 5 is connected electrically to the inner bottom of the cell case 8 which is itself serving as the negative terminal.

The positive lead is connected to the positive terminal of the cover 9. Then, non-aqueous electrolyte is filled in the cell case 8 and the case is sealed to complete the test cell. In this series of experiments an organic electrolyte of 1 mol/1 LiClO$_4$ propylene carbonate solution was used as the non-aqueous electrolyte.

As the conventional electrode example to show the effect of this invention by comparison, PE was used as the binder for the active material holder of the negative electrode. Other than that the negative electrode and the test cell were made under the same conditions as those of this invention's example.

Charge and discharge tests were conducted at the ambient temperature of 20° C. A constant current density of 0.5 mA/cm$^2$ was kept for charge and discharge cycles. The charge cut-off voltage for the active material holders of Al and also Al alloys which were examined here was set at 4.0 V max.

For the active material holder of graphite it was set at 4.1 V max. The discharge end voltage was fixed at 3.0 V min.

Tests were made on 10 cells of each and average values of those 10 cells were obtained.

As previously mentioned, Al of 300 mesh pass, Al alloy (94 wt % Al, 6 wt % Ni) and graphite powder were used as the active material holders.

EXAMPLE 1

Vinylchloride-vinyl acetate co-polymer (VC-VAc) was used as the binder and the effects of changing the vinyl chloride (VC) content in the co-polymer were investigated. A methyl ethyl ketone (MEK) solution of the foregoing co-polymer with a varying VC content was added to the active material holder powder and the whole mixture was mulled and formed to a paste like condition. The past prepared in this way was coated on a copper foil collector and then the coated copper foil collector was dried and pressed by rolling to complete a negative electrode. The weight ratio of the active material holder to the binder was set to 95:5.

Table 1 shows the test results. The figures in parentheses located below the discharge capacity at 50 cycles in Table 1 show the capacity change rate in % against the initial capacity as set to 100%.

In Table 1, any values of the initial discharge capacity of the cell that uses vinylchloride-vinyl acetate co-polymer as the binder for the active material holders of negative electrodes, except for the ones with vinyl chloride content of 60 mol %, are larger than the initial discharge capacity values of the conventional cell that uses PE binder for the negative electrode.

The data of the discharge capacity at 50 cycles show much less deterioration with all the cells of the example of this invention than that of the cells of the conventional negative electrode wherein exfoliation and fall-out of active material holder layers and also shape change take place resulting in a great capacity reduction. In other words, the vinyl chloride-vinyl acetate co-polymer with the vinyl chloride content of 60-90% used as the binder for active material holders of negative electrodes can much improve the charge and discharge characteristics over the conventional practice.

TABLE 1

| Binder | VC Content in VC—VAc (mol %) | | | | | PE |
|---|---|---|---|---|---|---|
| | 95 | 85 | 75 | 65 | 60 | |
| Discharge Capacity(mAh) | | | | | | |
| Initial Al | 287 | 282 | 280 | 273 | 235 | 247 |
| Al Alloy | 279 | 274 | 273 | 265 | 227 | 241 |
| Graphite | 279 | 278 | 275 | 262 | 230 | 233 |
| 50 cycles Al | 207 | 214 | 216 | 216 | 186 | 99 |
| | (72) | (76) | (77) | (79) | (79) | (40) |
| Al Alloy | 206 | 214 | 216 | 215 | 184 | 99 |
| | (74) | (78) | (79) | (81) | (81) | (41) |
| Graphite | 201 | 206 | 201 | 202 | 179 | 93 |
| | (72) | (74) | (73) | (77) | (78) | (42) |

EXAMPLE 2

Acetylene black as a conductive material was added with a weight ratio of 5 to 95 to the powder of the active material holders Al, Al alloy and graphite prepared according to Example 1. As the binder, vinyl chloride-vinyl acetate co-polymer(VC-VAc), polyvinyl acetate(PVAc) and polyvinyl butyral(PVB) were added respectively with a weight ratio of 1:1 to polyvinyl chloride(PVC) and then the PVC and the added resins were dissolved together to form a solution or a dispersion. In the foregoing, VC-VAc of the VC content of 65 mol % was used. As the binder different from the above group of binders, rubber like elastic polymers such as styrene-ethylene-butylene-styrene co-polymer (SEBS), polybutadiene(BR), acrylonitrile-butadiene co-polymer(NBR) and methyl methacrylate-butadiene co-polymer(MBR) were dissolved respectively to form a solution or a dispersion. The solution or dispersion of these binders was added to the foregoing mixture of the active material holders and the conductive material and then the whole mixture was mulled and made to form paste. Using this paste, negative electrodes and then test cells were prepared in the same way as described in Example 1. The weight ratio of the above mixture of active material holders and conductive material to the binders was set as 90:10. Table 2 shows the test results.

For a comparison, PE is used as the conventional binder in the same manner as in Example 1.

The initial capacity values of Table 2 show excellent values of higher capacity on all the active material holders using various binders of this invention than that of the conventional PE binder. In connection with the 50 cycle discharge capacity, the capacity deterioration of the cells due to charge and discharge cycles is much less with the various binders of this invention in the same way as seen with VC-VAc in Table 1 than with the conventional PE binder, resulting in an improved cycle characteristics. The binding strength of the conventional PE even with 10 wt. %, twice as much as 5 wt. % of Example 1, was not sufficient and the cycle characteristics were not much improved. Among the binders of this invention, the ones of PVC with addition of VC-VAc, PVAc or PVB have an excellent binding strength compared with the one comprising only PVC. When a binder is composed of PVC only, it is suited to form a porous construction of negative electrodes after the solvent is dried and evaporated but has a flaw of causing insufficient flexibility of electrodes and consequently poor cycle characteristics.

The rubber like elastic polymer binder group enhances the flexibility of electrodes greatly. Adding acetylene black to various active material holders as a conductive material will lead to a volume reduction of active material holders without causing any reduction in discharge capacity and it is judged that the addition of the conductive material has the advantage of increasing the utilization rate of negative electrodes. In addition to the acetylene black used as a conductive material in this example, we have confirmed that the high purity graphite powder is effectively added to the active material holders composed of such metal powders as Al, Al alloy, etc.

TABLE 2

| Binder | PVC+ VC—VAc | PVC+ PVAc | PVC+ PVB | SEBS | BR | NBR | MBR | PE |
|---|---|---|---|---|---|---|---|---|
| Discharge Capacity(mAh) | | | | | | | | |
| Initial Al | 274 | 273 | 279 | 281 | 270 | 266 | 265 | 238 |
| Al Alloy | 264 | 266 | 272 | 274 | 266 | 251 | 258 | 232 |
| Graphite | 263 | 263 | 268 | 273 | 263 | 258 | 251 | 225 |
| 50 cycles Al | 221 | 218 | 217 | 247 | 216 | 197 | 195 | 112 |
| | (81) | (80) | (78) | (88) | (84) | (74) | (73) | (47) |
| Al Alloy | 219 | 218 | 220 | 247 | 234 | 196 | 194 | 111 |
| | (83) | (82) | (81) | (90) | (88) | (78) | (75) | (48) |
| Graphite | 213 | 210 | 206 | 227 | 210 | 199 | 178 | 95 |
| | (81) | (80) | (77) | (83) | (80) | (77) | (71) | (42) |

EXAMPLE 3

Charge and discharge tests were conducted on the negative electrodes and the test cells prepared according to Example 1 and Example 2, using a mixture of graphite powder as the active material holder and acetylene black as the conductive material (weight ratio of 95:5), and VC-VAc (VC content: 65 mol %) and also PE binder for the reference electrode of the conventional method. Table 3 shows the test results.

TABLE 3

| Binder | Content (wt %) | | | | | | |
|---|---|---|---|---|---|---|---|
| | 1 | 2 | 5 | 10 | 15 | 20 | 25 |
| Discharge Capacity(mAh) | | | | | | | |
| Initial VC—VAc | 282 | 279 | 278 | 269 | 245 | 237 | 187 |
| PE | 240 | 238 | 233 | 225 | 207 | 199 | 160 |
| 50 VC—VAc | 130 | 193 | 206 | 204 | 191 | 194 | 157 |

TABLE 3-continued

| Binder | Content (wt %) | | | | | | |
|---|---|---|---|---|---|---|---|
| cycles | 1 | 2 | 5 | 10 | 15 | 20 | 25 |
| PE | (46) | (69) | (74) | (76) | (78) | (82) | (84) |
|  | 75 | 88 | 93 | 95 | 106 | 121 | 114 |
|  | (31) | (37) | (40) | (42) | (51) | (61) | (71) |

Table 3 shows that with the conventional PE binder the initial capacity tends to decrease whereas the capacity after 50 cycles tends to prevent a capacity reduction as the PE content is increased. This means that a certain level of cycle characteristics can not be maintained unless the PE content is increased at the sacrifice of the discharge capacity. In contrast with this, the data on the initial capacity and the capacity after 50 cycles as well show that with VC-VAc, one of the binders of this invention, the binder content ranging from 2 to 20 wt % is appropriate. When the binder content is as low as 1 wt %, the binding strength is weak and shape change in the negative electrode takes place with a resultant deterioration in cycle characteristics. With the binder content is excess of 20 wt %, for example 25 wt %, the discharge capacity decreases beyond a suitable level. Although only the data on the VC-VAc binder of this invention are furnished here, all other binders show the same tendency and also with the use of Al and Al alloy as the active material holder, the same effects are obtainable.

EXAMPLE 4

In Example 2 and 3, an advantageous use of carbon black like acetylene black or carbon powder like high purity graphite, etc. as a conductive material to be added to the active material holder was explained.

Example 4 deals with effectiveness of using fibrous graphite as a conductive material.

An active material holder composed of graphite powder or a mixture of graphite powder and acetylene black as conductive material or fibrous graphite (graphite whisker of 0.1 $\mu$m in diameter and 20 $\mu$m in length) produced by the gas-phase crystal growth method as conductive material is added with a VC-VAc (VC content of 75 mol %) binder in 5 wt % and mulled to make paste.

Using this paste a negative electrode and a cell are prepared according to the same conditions as Example 1, 2 and 3 and then charge and discharge tests were made. Table 4 shows the test results.

TABLE 4

| Conductive Material | None | Acetylene Black | Fibrous Graphite |
|---|---|---|---|
| Discharge Capacity(mAh) | | | |
| Initial | 268 | 282 | 285 |
| 50 cycles | 201 | 214 | 245 |
|  | (75) | (76) | (86) |

It was reconfirmed from Table 4 that the use of acetylene black as a conductive material is effective. Moreover, it was realized that the use of fibrous graphite as a conductive material brings about an effective improvement in the initial capacity and the cycle characteristics as well. This is assumedly attributed to the fact that the fibrous graphite serves not only to enhancing conductivity but also suppressing the deterioration due to shape changes. The graphite fibers that are produced first by carbonizing acrylic fibers already mass-produced by the industry and then by graphitizing them at high temperature can also be used as a fibrous graphite as equally effective as the graphite whiskers of 0.05 to 0.5 $\mu$m in diameter and 1 to 50 $\mu$m in length. Especially, the above graphite fibers are most effectively utilized when used together with the active material holder of metal powder wherein graphite powder worked effectively as a conductive material.

Figure 2:
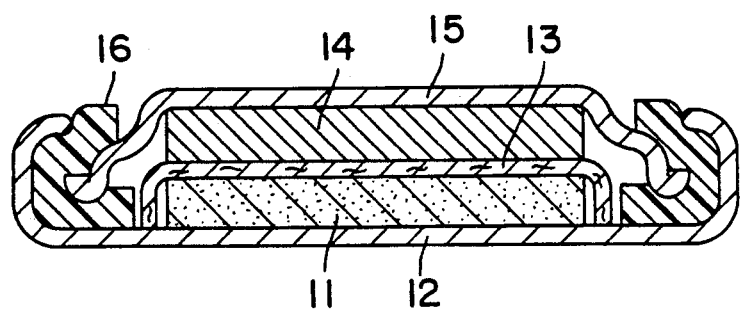
FIG. 2 is a cross-sectional view of a coin type non-aqueous electolyte secondary battery which introduces one of the examples of this invention.

In Example 1, 2, 3 and 4 of this invention, detailed explanations have been been given to Al, Al alloy (94 wt % Al, 6 wt % Ni) and graphite used as an active material holder. The various binders of this invention can also be used effectively in such active material holders as metal powders of of the metal elements Sn, Pb. In and Bi or the powders of alloys derived from these metal elements like Wood's metal, and a sulfide like $TiS_2$ and also an oxide like $Nb_2O_5$. Also, examples of this invention have explained a cylindrical cell which is formed by winding thin and long strip type positive electrode and negative electrode together with separators inserted in between. Similarly, this invention can be applied to a coin type cell as shown in FIG. 2. In FIG. 2, a negative electrode 14 of this invention is stuck on a positive electrode 11 with a separator 13 of micro-porous polypropylene films being placed in between and covering the positive electrode. The positive electrode 11 is made by molding a mixture of $LiCoO_2$, acetylene black and PTFE, and placed in the center of the bottom inside of a cell case 12. The item 15 is a cell cover and the item 16 is a gasket. Usually with a coin type cell it is not necessary to use foil collectors for the positive and negative electrodes.

As explained in a great detail in the foregoing, this invention deals with a negative electrode of high capacity and of low capacity deterioration caused by charge and discharge cycles, wherein active material holders composed of such materials in a powder form as metal, carbon, sulfide, oxide etc. are used and Li is absorbed by charge and desorbed by discharge, or wherein a mixture of the foregoing active material holders and conductive materials is added with a suitable binder and whereby a highly reliable non-aqueous electrolyte secondary battery is built for the great benifit of the industry.

What is claimed is:

1. A negative electrode for a non-aqueous electrolyte secondary battery comprising:
   a binder comprising at least one compound selected from the group consisting of
      (i) vinyl chloride-vinyl acetate copolymer,
      (ii) a mixture of polyvinyl chloride and a polymer which enhances the binding strength of said polyvinyl chloride and
      (iii) an elastic polymer selected from the group consisting of styrene-ethylene-butylene-styrene copolymer, polybutadiene, acrylonitrile-butadiene copolymer or methyl methacrylate-butadiene copolymer;
   said negative electrode further comprising:
   an active material holder selected from the group consisting of powdered metal, carbon, sulfide, and oxide, which active material holder absorbs lithium by charge and desorbs lithium by discharge; and,
   a conductive material;
   wherein said binder binds to one of a) said active material holder and b) a mixture of said active material holder and said conductive material.

2. The negative electrode of claim 1, wherein the amount of said vinyl chloride in said vinyl chloride-vinyl acetate copolymer ranges from 60 to 95 mol %.

3. The negative electrode of claim 1, wherein said polymer which enhances the binding strength of said polyvinyl chloride is at least one material selected from the group consisting of vinyl chloride-vinyl acetate copolymer, polyvinyl acetate and polyvinyl butyral.

4. The negative electrode of claim 1, wherein said binder is added to one of a) said active material holder and b) said mixture comprising said active material holder and said conductive material in a concentration of 2 to 20 wt %, following evaporation of a solvent used in formation of said binder.

5. The negative electrode of claim 1, wherein said electrode is formed by
   dissolving said binder in a solvent to form a solution or a dispersion;
   mixing said solution or dispersion with one of a) said active material holder and b) a mixture of said active material holder and said condutive material to form a paste;
   coating said paste on a collector by mulling, wherein said collector comprises metal foils of copper and nickel; and,
   drying and pressing said electrode.

6. The negative electrode of claim 1, wherein said conductive material comprises powdered carbon.

7. The negative electrode of claim 6, wherein said powdered carbon comprises fibrous graphite.

* * * * *